(12) United States Patent
Matsushita

(10) Patent No.: US 6,869,109 B2
(45) Date of Patent: Mar. 22, 2005

(54) PIPE JOINT

(75) Inventor: Kazuhiro Matsushita, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/657,203

(22) Filed: Sep. 9, 2003

(65) Prior Publication Data

US 2004/0080161 A1 Apr. 29, 2004

(30) Foreign Application Priority Data

Oct. 23, 2002 (JP) .......................................... 2002-308848

(51) Int. Cl.⁷ .............................................. F16L 37/00
(52) U.S. Cl. ........................ 285/308; 285/322; 285/374
(58) Field of Search ................................ 285/308, 340, 285/322, 315, 374

(56) References Cited

U.S. PATENT DOCUMENTS

| | | | | |
|---|---|---|---|---|
| 4,685,706 A | * | 8/1987 | Kowal et al. ................ | 285/322 |
| 4,890,865 A | * | 1/1990 | Hosono et al. ........ | 285/123.15 |
| 4,919,457 A | * | 4/1990 | Moretti ........................ | 285/308 |
| 5,160,179 A | * | 11/1992 | Takagi ......................... | 285/340 |
| 5,292,157 A | * | 3/1994 | Rubichon .................... | 285/308 |
| 5,474,336 A | * | 12/1995 | Hoff et al. ................... | 285/322 |
| 5,511,830 A | * | 4/1996 | Olson et al. ................. | 285/323 |
| 5,722,696 A | * | 3/1998 | Taneya ........................ | 285/322 |
| 5,911,443 A | * | 6/1999 | Le Quere .................... | 285/340 |
| 6,145,887 A | * | 11/2000 | Cambot-Courrau ......... | 285/308 |
| 6,224,117 B1 | * | 5/2001 | Olson et al. ................. | 285/322 |
| 6,312,019 B1 | * | 11/2001 | Nakazumi et al. .......... | 285/308 |
| 6,612,623 B2 | * | 9/2003 | Salomon-Bahls ........... | 285/308 |

FOREIGN PATENT DOCUMENTS

JP  2000-55270  2/2000

* cited by examiner

Primary Examiner—David Bochna
(74) Attorney, Agent, or Firm—Oblon, Spivak, McClelland, Maier & Neustadt, P.C.

(57) ABSTRACT

A recessed portion is formed on an outer periphery of a cylindrical joint body to be inserted into a joint mounting hole of a fluid pressure apparatus. A pull-out preventing ring which is formed separately from the joint body can be deformed elastically in a radial direction, and has one or more annular edge(s) on an outer peripheral face which is fitted in the recessed portion and over the outer periphery of the joint body. The annular edge(s) of the pull-out preventing ring is(are) locked to a hole wall of the joint mounting hole when a force in such a direction as to pull out the pipe joint acts on the pipe joint.

13 Claims, 4 Drawing Sheets

PIPE JOINT

TECHNICAL FIELD

The present invention relates to a pipe joint used for connecting a piping tube to a fluid pressure apparatus of various kinds in a fluid pressure circuit using fluid pressure such as air pressure and hydraulic pressure.

BACKGROUND ART

Conventionally, in general, a quick-connecting-type pipe joint is used to connect a piping tube to a piping connecting hole of a fluid pressure apparatus. The pipe joint is mounted by press-fitting a cylindrical joint body into the pipe connecting hole (joint mounting hole) of the fluid pressure apparatus. At this time, a pull-out prevention formed of a claw, a projection, or the like is formed on an outer peripheral face of the joint body and locked to a hole wall of the joint mounting hole to thereby prevent the pipe joint from pulling-out of the mounting hole.

However, in the above conventional pipe joint, the pull-out prevention is formed integrally with the joint body and the joint bodies are of a uniform outside diameter. Therefore, the pipe joint cannot be mounted to the joint mounting hole if they are of different dimensions. The pull-out prevention cannot be locked to the hole wall of the joint mounting hole or, on the contrary, the pull-out prevention lodges in the joint mounting hole and the pipe joint cannot be mounted. Especially, dimensional tolerances, errors, and the like may occur informing some of joint bodies of pipe joints and pull-out prevention, joint mounting holes of fluid pressure apparatus, or the like. Therefore, it is quite conceivable that the pull-out prevention does not effectively function and therefore a reliable pull-out preventing effect cannot be obtained or that the pipe joint cannot be mounted to the fluid pressure apparatus depending on the tolerances and errors of both the members.

DISCLOSURE OF THE INVENTION

It is a technical object of the present invention to reliably mount a pipe joint into a joint mounting hole of a fluid pressure apparatus while preventing pulling-out of the pipe joint even if there are slight dimensional differences due to tolerances and errors between the pipe joint and the joint mounting hole of a fluid pressure apparatus.

To achieve the above object, according to the invention, there is provided a pipe joint comprising: a cylindrical joint body having a first end on one side in an axial direction and a second end on the other side in the axial direction to be inserted into a joint mounting hole of a fluid pressure apparatus from a side of the first end; a tube connecting hole opened on a side of the second end of the joint body; a chuck member provided in the joint body to be locked to a piping tube inserted into the tube connecting hole; a sealing member for sealing a periphery of the tube; a release member for releasing locking of the chuck member to the tube; and a pull-out preventing ring provided to an outer periphery of the joint body to prevent the joint body from pulling-out of the joint mounting hole, wherein the pull-out preventing ring is formed separately from the joint body, can elastically be deformed in a radial direction, and has on its outer peripheral face one or more annular edge(s) to be locked to a hole wall of the joint mounting hole.

The pipe joint having the above structure is mounted to the fluid pressure apparatus by inserting the joint body into the joint mounting hole of the fluid pressure apparatus and the piping tube is connected to the tube connecting hole. At this time, the pull-out preventing ring mounted to the outer periphery of the joint body is elastically press-fitted in the joint mounting hole by elastic deformation in the radial direction and the annular edge(s) on the outer peripheral face is(are) locked to the hole wall of the joint mounting hole. Therefore, even if there are some dimensional differences due to tolerances, errors, and the like between the pipe joint and the joint mounting hole, such differences are absorbed by elasticity of the pull-out preventing ring, the pull-out preventing ring is reliably fitted in the joint mounting hole, and the annular edge(s) is(are) locked to the hole wall. If an external force in such a direction as to pull the pipe joint out of the joint mounting hole acts on the pipe joint through the tube, the pipe joint is prevented from being pulled out of the joint mounting hole by locking of the annular edge(s).

In the invention, it is preferable that the annular edge(s) is(are) formed in a position close to an axial base end portion of the pull-out preventing ring with its(their) nose(s) directed toward the second end of the joint body.

Although the pull-out preventing ring may be in a shape of a complete ring, it is preferable that the ring is in a split-ring shape having at a portion of a circumference thereof a split to have a proper degree of elasticity.

The pull-out preventing ring may be formed with two annular edges in positions adjacent to each other in an axial direction.

According to another embodiment of the invention, the pull-out preventing ring is fitted in a recessed portion formed on an outer periphery of the joint body with degrees of freedom in axial and radial directions.

In this case, it is preferable that the joint body is formed of a first body portion on the side of the first end, a second body portion on the side of the second end, and an intermediate third body portion connecting both of the body portions, that the third body portion has a large diameter portion to be fitted over an outside of the first body portion, a small diameter portion to be fitted in the second body portion, and the recessed portion divided by the large diameter portion and the second body portion on an outer periphery of the small diameter portion, and that the pull-out preventing ring is fitted in the recessed portion.

BRIEF DESCRIPTION OF THE INVENTION

BEST MODE FOR CARRYING OUT THE INVENTION

Figure 1:
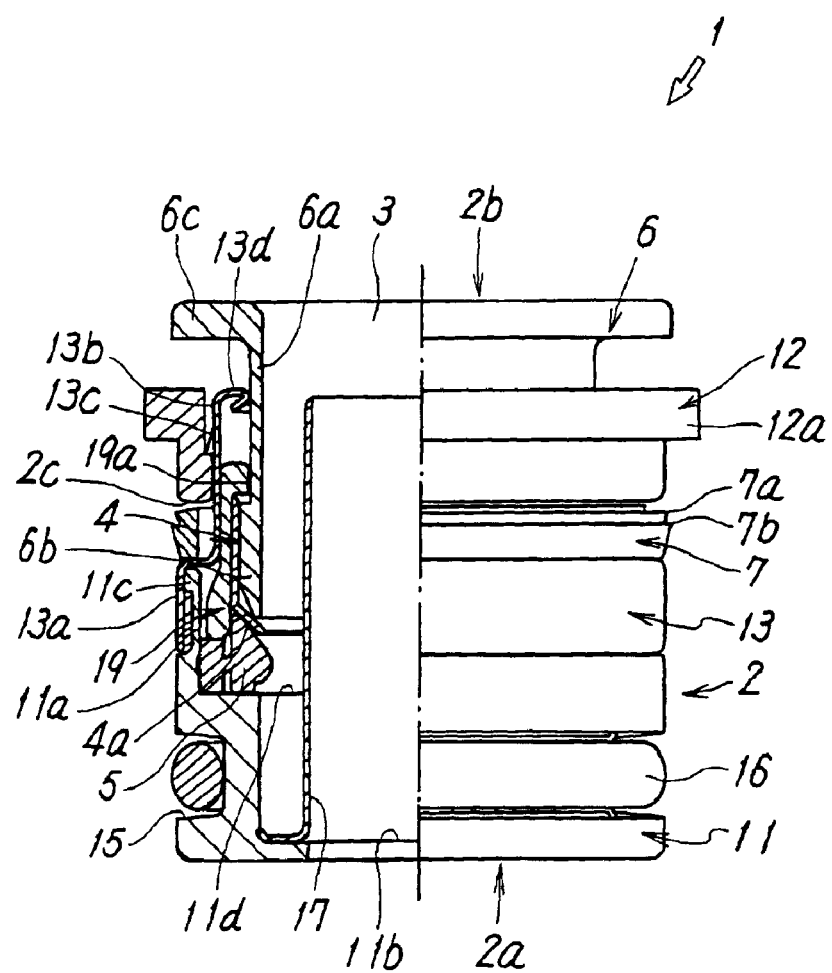
FIG. 1 is a partially sectional view of a pipe joint according to the present invention.
Figure 2:
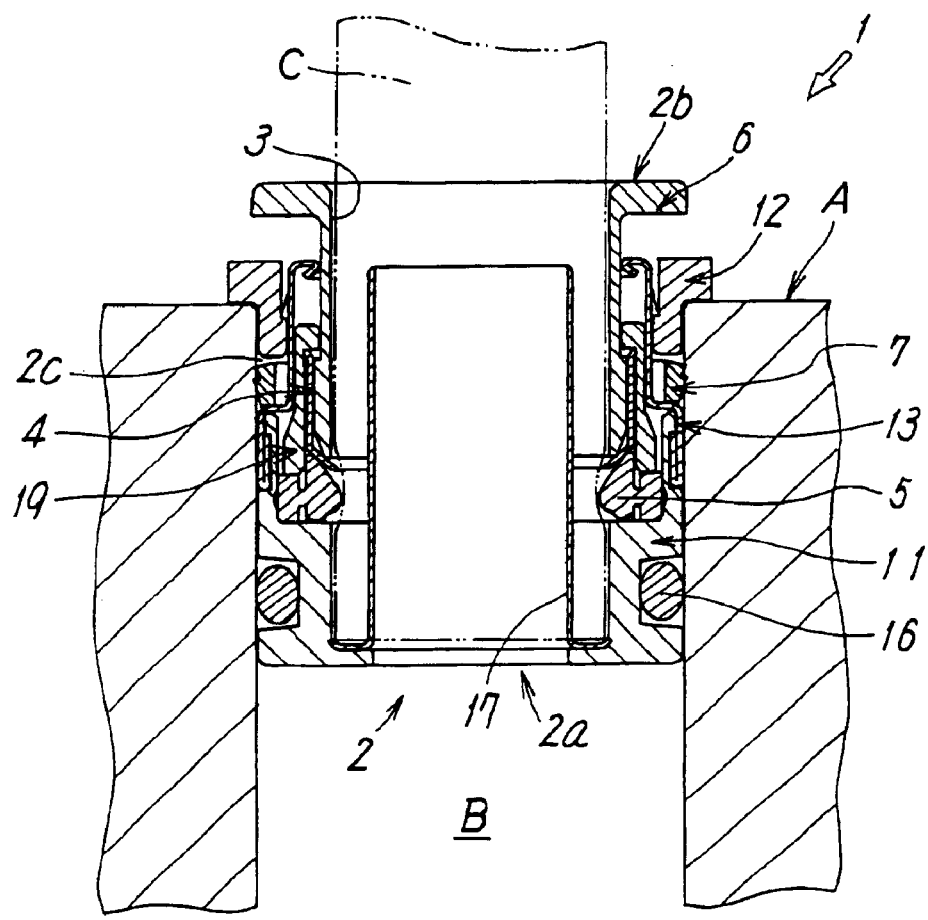
FIG. 2 is a sectional view showing a state of use of the pipe joint according to the invention.

FIGS. 1 and 2 show an embodiment of a pipe joint of the present invention. The pipe joint 1 has a cylindrical joint body 2 to be inserted into a joint mounting hole B of a fluid pressure apparatus A. The joint body 2 includes a first end 2a on one of an axial direction side and a second end 2b on an opposite side, is inserted into the joint mounting hole B of the fluid pressure apparatus A from the first end 2a, and is formed of a first body portion 11 positioned on the first end 2a side, a second body portion 12 positioned on the second end 2b side, and an intermediate third body portion 13 connecting both the body portions 11 and 12.

The first body portion 11 is made of metal or synthetic resin and has a seal groove 15 surrounding an outer periphery of the portion 11. An O-ring 16 is provided in the seal groove 15 and the O-ring 16 provides sealing between an outer peripheral face of the joint body 2 and an inner peripheral face of the joint mounting hole B. In the first body portion 11, a step portion 11b with which a tip end of a piping tube C comes in contact is provided in a position close to a tip end of the portion 11 and a tube support pipe 17 fitted in the tip end of the piping tube C is mounted onto the step portion 11b. A base end portion of the first body portion 11 is formed into a tubular connecting portion 11a with a slightly smaller diameter. The connecting portion 11a is fitted in a large diameter portion 13a of the third body portion 13 and locked to the large diameter portion 13a by a projection 11c.

The third body portion 13 is formed of a cylindrical member made of metal and has the large diameter portion 13a on a tip end side and a small diameter portion 13b on a base end side. The large diameter portion 13a is connected to the connecting portion 11a of the first body portion 11 and the small diameter portion 13b is fitted in the second body portion 12 and connected to the second body portion 12 by a locking claw 13c on an outer periphery of the small diameter portion 13b while being prevented from being pulled out.

The second body portion 12 is made of metal or synthetic resin and has at its base end portion a flange-shaped locking edge 12a. The locking edge 12a is locked to a hole edge of the joint mounting hole B of the fluid pressure apparatus A to thereby define a maximum inserting position of the pipe joint 1.

A portion of the first body portion 11 excluding the connecting portion 11a, a portion of the second body portion 12 excluding the locking edge 12a, and the large diameter portion 13a of the third body portion 13 have substantially the same outer dimensions and these dimensions are just right to fit in the joint mounting hole B.

In the second end 2b on the base end side of the joint body 2, a tube connecting hole 3 into which the piping tube C is to be inserted is opened. In the joint body 2, a chuck member 4 to be locked to the inserted tube C, a sealing member 5 for sealing a periphery of the tube C, and a release member 6 for releasing locking of the chuck member 4 to the tube C are provided. Over an outer periphery of the joint body 2, a pull-out preventing ring 7 for the joint body 2 from being pulled out of the joint mounting hole B is fitted.

The chuck member 4 is formed of a tubular member made of metal and has a plurality of elastic locking claws 4a with tip ends thereof inclining inward. The elastic locking claws 4a are formed by providing a plurality of slits in the axial direction to the tubular member. When the tube C is inserted into the tube connecting hole 3, the tip ends of the locking claws 4a elastically bite in and are locked to an outer periphery of the tube C to fix the tube C while preventing the tube C from being pulled out. The chuck member 4 is inserted into a tubular collet 19 to thereby retained by the collet 19 and is housed in the third body portion 13 of the joint body 2 through the collet 19.

The sealing member 5 is disposed on a step portion 11d inside the first body portion 11 and retained between the step portion 11d and the collet 19.

The release member 6 has a cylindrical main body portion 6a, a pressing portion 6b formed at a tip end of the main body portion 6a, and a flange portion 6c for operation and formed at a base end portion of the main body portion 6a. An outer peripheral face of the main body portion 6a is supported slidably on guide portions 13d and 19a formed at the third body portion 13 of the joint body 2 and the collet 19. The pressing portion 6b is in contact with inner faces of the locking claws 4a of a chuck member 4. The flange portion 6c projects outside from the joint body 2. If the flange portion 6c is pressed to push the release member 6 into the joint body 2, a tip end of the pressing portion 6b spreads the locking claws 4a out to detach the claws 4a from the tube C and therefore the tube C can be pulled out. If pressing of the flange portion 6c is released, the spread-out locking claws 4a return due to elastic forces and therefore the release member 6 is moved rearward by the returning force to return to a home position.

Figure 3:
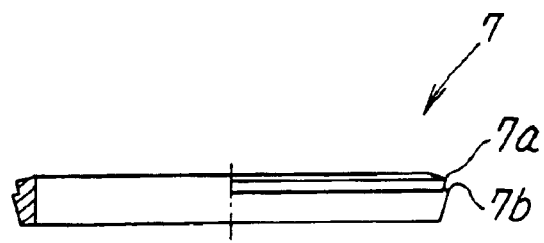
FIG. 3 is a partially sectional view of a pull-out preventing ring.

The pull-out preventing ring 7 for preventing the joint body 2 from pulling-out of the joint mounting hole B is, as can be seen in FIG. 3, a member separate from the joint body 2, made of material such as tool steel which has been subjected to heat treatment and has excellent elasticity to be formed into a C shape, i.e., a split-ring shape having at a portion of a circumference thereof a split, and can elastically be deformed in a radial direction. The ring 7 is housed in a recessed portion 2c formed at a portion of the outer periphery of the joint body 2 with degrees of freedom in axial and radial directions. The recessed portion 2c is divided by the outer periphery of the small diameter portion 13b of the third body portion 13 by the large diameter portion 13a of the third body portion 13 and the second body portion 12.

Figure 4:
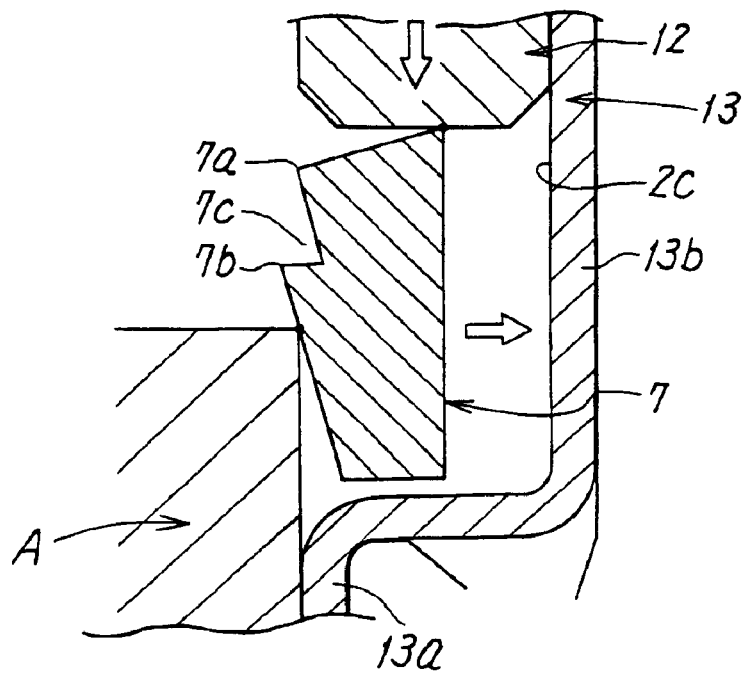
FIG. 4 is an enlarged sectional view of an essential portion and showing a state of the pull-out preventing ring in mounting the pipe joint.
Figure 5:
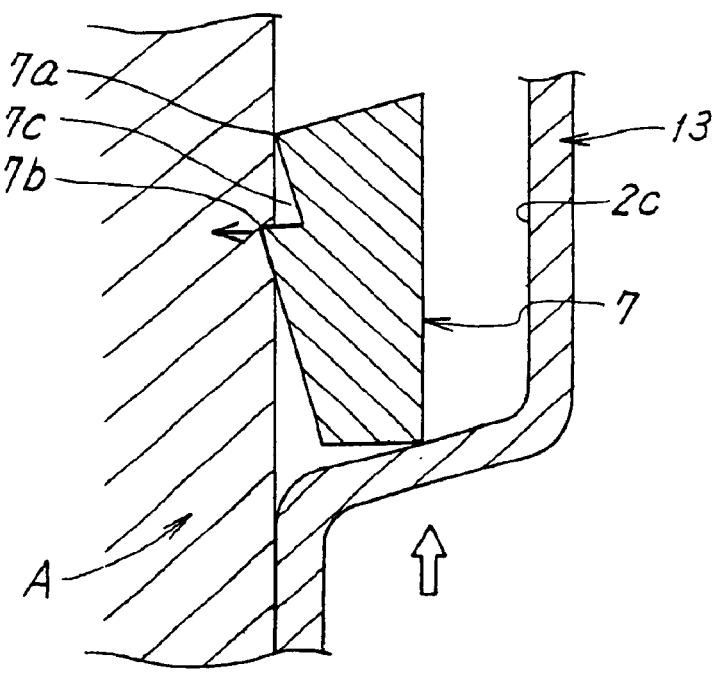
FIG. 5 is an enlarged sectional view of an essential portion showing a state of the pull-out preventing ring when an external force in a pulling-out direction acts on the pipe joint.

On an outer peripheral face at the position close to the base end portion in the axial direction of the pull-out preventing ring 7, first and second two annular edges 7a and 7b to be locked to the hole wall of the joint mounting hole B are provided to be adjacent to each other with their noses directed toward the base end side, i.e., the second end 2b side of the joint body 2. Outer dimensions of the annular edges 7a and 7b are slightly larger than an outer dimension of a portion of the joint body 2 to be inserted into the joint mounting hole B. When the joint body 2 is inserted into the joint mounting hole B, as shown in FIG. 4, the annular edges 7a and 7b are pushed inward from an outer periphery side by the hole wall of the joint mounting hole B and are elastically deformed in such a direction as to reduce a diameter of the pull-out preventing ring 7. Therefore, insertion of the joint body 2 is carried out smoothly with a small resistance. After the insertion, as shown in FIG. 5, the pull-out preventing ring 7 elastically expands to regain its original diameter and one or both of the annular edges 7a and 7b is (are) elastically brought into contact with and locked to the hole wall of the joint mounting hole B.

Each of the annular edges 7a and 7b is preferably formed to have an acute angle or an obtuse angle as close to an acute angle as possible. Formed between the annular edges 7a and 7b is a space portion 7c for housing a chip 21 produced when the second annular edge 7b chips off a portion of the hole wall in biting into the hole wall to perform a function of preventing pulling-out.

In mounting the pipe joint 1 having the above structure to the fluid pressure apparatus A, the joint body 2 is inserted into the joint mounting hole B from the first end 2a at the tip end. At this time, although the annular edges 7a and 7b of the pull-out preventing ring 7 are projecting outside from the outer peripheral face of the joint body 2, the annular edges 7a and 7b are pushed against the hole wall of the joint mounting hole B and are elastically deformed in such a direction as to reduce the diameter of the pull-out preventing ring 7 as the pipe joint is inserted into the joint mounting hole B as shown in FIG. 4 and therefore the annular edges 7a and 7b do not obstruct the insertion. Moreover, because the pull-out preventing ring 7 is pushed in a direction opposite to that of the noses of the annular edges 7a and 7b, the annular edges 7a and 7b are not locked to the hole wall and the insertion is carried out smoothly with a small resistance.

Therefore, even if there are some dimensional differences due to tolerances, errors, and the like between the pipe joint 1 and the joint mounting hole B, such differences are absorbed by elastic deformation of the pull-out preventing ring 7, the pull-out preventing ring 7 is reliably fitted in the joint mounting hole B, and the annular edges 7a and 7b are locked to the hole wall.

Thus, the pipe joint 1 is easily inserted into the joint mounting hole B and the pull-out preventing ring 7 is brought into a state in which the annular edges 7a and 7b are pressed against the hole wall of the mounting hole B by an outward elastic force accumulated by a reduction in the diameter.

If the piping tube C is inserted into the tube connecting hole 3 in this state, the tip ends of the locking claws 4a elastically bite in and are locked to the outer periphery of the tube C and therefore the tube C is connected while being prevented from being pulled out.

Figure 6:
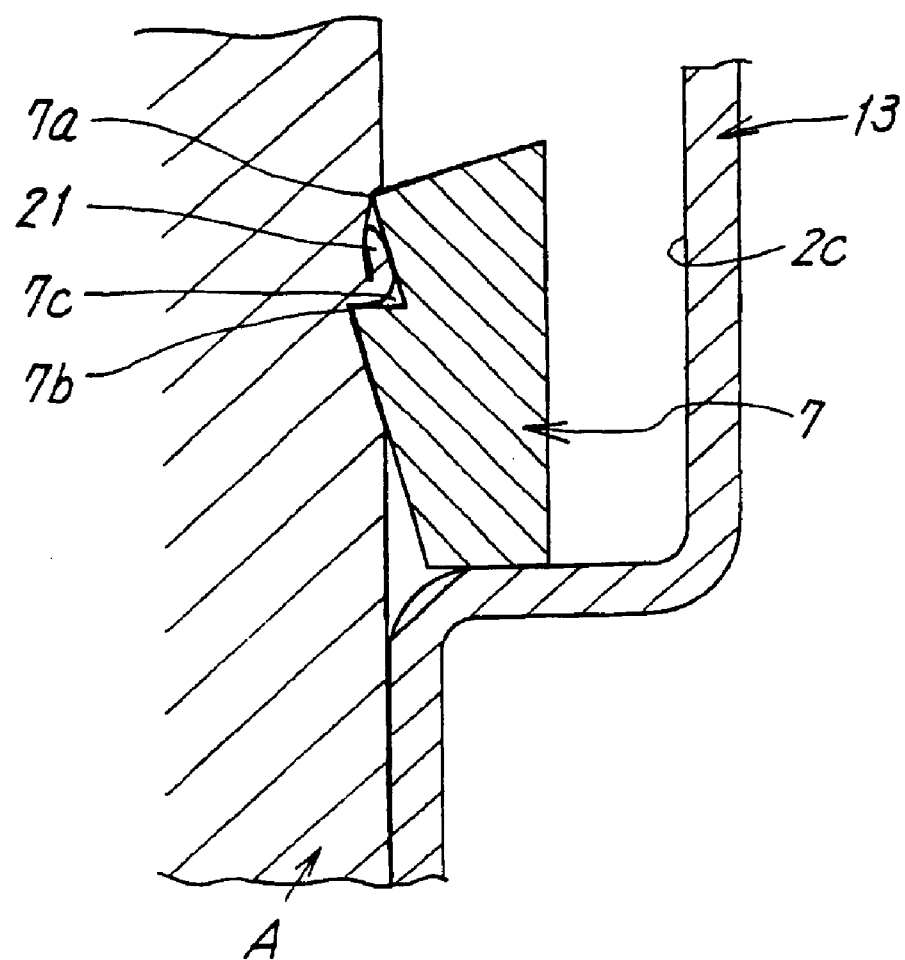
FIG. 6 is an enlarged sectional view of an essential portion showing a state in which an annular edge of the pull-out preventing ring chips off a hole wall of a joint mounting hole.

Here, if an external force in such a direction as to pull the pipe joint 1 out of the joint mounting hole B acts on the pipe joint 1 through the tube C, because the annular edges 7a and 7b of the pull-out preventing ring 7 are formed with their noses directed toward the second end 2b side of the joint body 2 as shown in FIG. 5, one or both of the annular edge(s) bite(s) in and is(are) locked to the hole wall of the joint mounting hole B to prevent the pipe joint 1 from being pulled out from the joint mounting hole B. In this case, when the second annular edge 7b bites in the hole wall of the joint mounting hole B and chips off a surface of the hole wall, the chip 21 is housed in the space portion 7c between both the edges as shown in FIG. 6 and is not raked outside. Moreover, the chip 21 functions as a resistance to further enhance the pull-out preventing effect.

Although the two annular edges 7a and 7b are provided to the outer peripheral face of the pull-out preventing ring 7 in the above embodiment, the number of the annular edges may be one, three, or more. If three or more annular edges are provided, it is preferable to provide space portions for housing the chip between respective edges.

Although the pull-out preventing ring 7 is in the split-ring shape having at the portion of the circumference thereof the split, the ring 7 may be a complete circular ring (O-shaped ring) without a split.

Although the joint body 2 of the embodiment is divided into the first body portion 11, the second body portion 12, and the third body portion 13 and is formed by assembling the respective body portions, the joint body 2 may be formed of two body portions or the whole joint body 2 may be molded into an integral cylindrical shape. If the joint body 2 is molded into an integral body, it is needless to say that the recessed portion 2c is formed on an outer periphery of the joint body 2 and that the pull-out preventing ring 7 is fitted in the recessed portion 2c with degrees of freedom in the axial and radial directions.

As described above, according to the pipe joint, the pull-out preventing ring is formed separately from the joint body, can elastically be deformed in the radial direction, and is fitted over the outer periphery of the joint body with degrees of freedom in the axial and radial directions. Therefore, the ring contracts in the radial direction and does not obstruct insertion of the pipe joint when the pipe joint is inserted into the joint mounting hole of the fluid pressure apparatus. After the insertion, the diameter of the ring increases according to a bore of the mounting hole, the annular edges on the outer peripheral face of the ring are caused to bite in the hole wall of the mounting hole, and the ring effectively functions as a pull-out prevention. Therefore, even if there are some differences due to tolerances between the bore of the mounting hole of the fluid pressure apparatus of various kinds and the outside diameter of the joint body of the pipe joint, it is possible to reliably and stably mount the pipe joint.

What is claimed is:

1. A pipe joint comprising:
    a cylindrical joint body having a first end on one side in an axial direction and a second end on the other side in the axial direction to be inserted into a joint mounting hole of a fluid pressure apparatus from a side of the first end;
    a tube connecting hole open on a side of the second end of the joint body;
    a chuck member provided in the joint body to be locked to a piping tube inserted into the tube connecting hole;
    a sealing member for sealing a periphery of the tube;
    a release member for releasing locking of the chuck member to the tube; and
    a pull-out preventing ring provided to an outer periphery of the joint body to prevent the joint body from being pulled out of the joint mounting hole,
    wherein the pull-out preventing ring is formed separately from the joint body, elastically deformable in a radial direction, and has on its outer peripheral face one or more annular edge to be locked to a hole wall of the joint mounting hole, and is in a split-ring shape having at a portion of a circumference thereof a split.

2. A pipe joint according to claim 1, wherein the annular edge(s) is(are) formed in a position close to an axial base end portion in the axial direction of the pull-out preventing ring with its(their) nose(s) directed toward the second end of the joint body.

3. A pipe joint according to claim 1, wherein the pull-out preventing ring has two annular edges in positions adjacent to each other in an axial direction.

4. A pipe joint according to claim 3, wherein a space portion for housing a chip which has flaked away from the hole wall of the joint mounting hole is provided between the two annular edges.

5. A pipe joint according to claim 1, wherein an angle of a section of the annular edge is 90° or smaller.

6. A pipe joint according to claim 1, wherein the pull-out preventing ring has two annular edges close to an axial direction base edge portion, and the annular edge(s) is(are) formed with its(their) nose(s) directed toward the second end of the joint body, having a space portion for housing a chip which has flaked away from the hole wall of the joint mounting hole provided between the two annular edges.

7. A pipe joint comprising:
a cylindrical joint body having a first end on one side in an axial direction and a second end on the other side in the axial direction to be inserted into a joint mounting hole of a fluid pressure apparatus from a side of the first end;
a tube connecting hole open on a side of the second end of the joint body;
a chuck member provided in the joint body to be locked to a piping tube inserted into the tube connecting hole;
a sealing member for sealing a periphery of the tube;
a release member for releasing locking of the chuck member to the tube; and
a pull-out preventing ring provided to an outer periphery of the joint body to prevent the joint body from being pulled out of the joint mounting hole,
wherein the pull-out preventing ring is formed separately from the joint body, elastically deformable in a radial direction, and has on its outer peripheral face one or more annular edge to be locked to a hole wall of the joint mounting hole, and is fitted in a recessed portion formed on an outer periphery of the joint body with degrees of freedom in axial and radial directions.

8. A pipe joint according to claim 7, wherein the joint body is formed of a first body portion on the side of the first end, a second body portion on the side of the second end, and an intermediate third body portion connecting both the body portions, the third body portion has a large diameter portion to be fitted over an outside of the first body portion, a small diameter portion to be fitted in the second body portion, and the recessed portion divided by the large diameter portion and the second body portion on an outer periphery of the small diameter portion, and the pull-out preventing ring is fitted in the recessed portion.

9. A pipe joint according to claim 8, wherein the annular edge(s) is(are) formed in a position close to an axial base end portion in the axial direction of the pull-out preventing ring with its(their) nose(s) directed toward the second end of the joint body.

10. A pipe joint according to claim 8, wherein the pull-out preventing ring has two annular edges in positions adjacent to each other in an axial direction.

11. A pipe joint according to claim 10, wherein a space portion for housing a chip which has flaked away from the hole wall of the joint mounting hole is provided between the two annular edges.

12. A pipe joint according claim 8, wherein the pull-out preventing ring is in a split-ring shape having at a portion of a circumference thereof a split.

13. A pipe joint according to claim 8, wherein the pull-out preventing ring has two annular edges close to an axial direction base edge portion, and the annular edge(s) is(are) formed with its(their) nose(s) directed toward the second end of the joint body, having a space portion for housing a chip which has flaked away from the hole wall of the joint mounting hole provided between the two annular edges.

* * * * *